C. H. COLVIN.
MAGNETIC COMPASS.
APPLICATION FILED JULY 19, 1919.

1,334,273.

Patented Mar. 16, 1920.

INVENTOR
BY Charles H. Colvin
J. C. Ledbetter
ATTORNEY

UNITED STATES PATENT OFFICE.

CHARLES H. COLVIN, OF BROOKLYN, NEW YORK.

MAGNETIC COMPASS.

1,334,273.   Specification of Letters Patent.   Patented Mar. 16, 1920.

Application filed July 19, 1919. Serial No. 311,960.

*To all whom it may concern:*

Be it known that I, CHARLES H. COLVIN, a citizen of the United States of America, residing at Brooklyn, in the county of Kings and State of New York, have invented certain new and useful Improvements in Magnetic Compasses, of which the following is a specification.

This invention relates to magnetic compasses. Particularly it relates to compasses for use in aircraft.

An object is to provide a compass which may be read either from the side or from the top and which may also be read from either the back or the front for obtaining the direction of flight. A further object is to provide a compass, the indicating means of which will appear magnified, making it possible to read the compass with increased ease and accuracy.

Another object of this invention is to provide a compass having a stabilized rose or magnetic element lightly suspended in a transparent container and floated in liquid to damp out erratic action of the element; and also to provide a compass rose or element where the friction between the walls of the container and the element is reduced to a minimum.

With these and other objects in view, the invention has relation to a combination and arrangement of compass parts, an example of which is described in the following specification, pointed out in the appended claims, and illustrated in the accompanying drawings, wherein:

Figure 2:
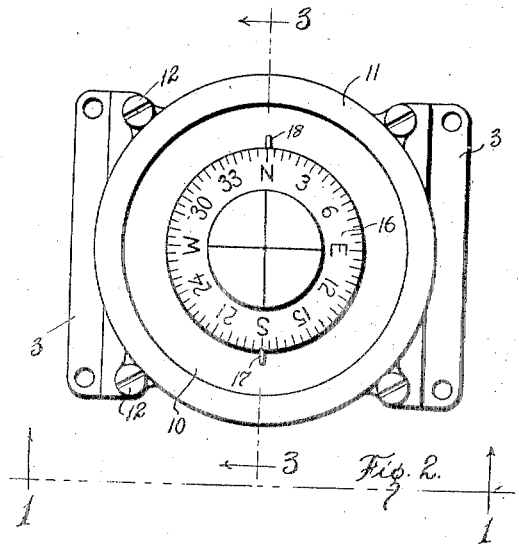
Fig. 2 is a top view of the compass, as indicated by the line 2—2 of Fig. 1.

A compass built according to the plans of this invention employs a liquid type transparent bowl or container in which is floated and pivoted a magnetic element or compass rose. This element has a two-part directional indicating card which may be read by the aviator either from the top or side, one part being a horizontal card with graduations, and the other part being approximately vertical with graduations. Each card is read separately from the other, and there exists a certain relation between the graduations of the cards which characterize this invention, as depicted in the appended claims.

Referring more particularly to the drawings, 2 points out a base upon which may be mounted one or more brackets 3 employed to hold the compass in service position on an airplane. The base is provided with an expansion diaphragm 4 of any approved type. The diaphragm is provided with a cover 7 fitted to the base. Holes are provided in the base to allow fluid movement relatively with the diaphragm. This construction provides an expansion chamber which compensates for liquid expansion due to temperature changes. A boss 8 is made on the cover and provided with tubular openings used to hold compensating magnets which are usually employed for correcting deflection of the magnetic element.

A transparent tubular casing or bowl 9 is fitted to the base with a flat transparent cover or plate 10 placed on the top of the bowl. A gasket is interposed between the edge of the bowl and base to form a liquid tight joint therebetween. A ring 11 is fitted to the periphery of the cover plate with suitable gaskets interposed between the ring and plate, and between the plate and edge of the bowl. Screws 12 are used to draw the ring and base together thus clamping the compass parts in secure relation. The compass bowl is filled with a suitable liquid.

A post 14 is fixed centrally to the base, and a magnetic element pivoted on the upper end thereof in any approved manner by using an appropriate form of pivot means between the element and post. The element may have a buoyant characteristic which functions to lightly support it on the post. The magnetic element comprises the usual float and magnets as is well known to those skilled in the art. The element further consists of a horizontal card 16 and a vertical card 15. The cards are indexed to indicate direction, and may be marked on or attached to the float in any approved manner.

As shown in the drawings, the four major directions are marked by the abbreviations N, S, E and W, with degree lines spaced between the abbreviations to facilitate the reading of the compass. The cards are marked upon, or attached to, the float in such a way that the marks on the horizontal card 16 indicate the direction which would be pointed out by a line drawn from the center of the card through the mark, and the marks on the vertical card 15 indicate the direction which would be pointed out by a line drawn from the mark through the center of the card. That is, the markings on the two cards differ from each other by a half circle, or 180 degrees. In viewing the compass from the side the pilot may read, for example, the mark N, and even though he is reading this mark made on the south side of the card, he will take the N mark as the direction on which the craft is headed. Then in reading the horizontal card he will read the N mark directly on the north side.

Figure 1:
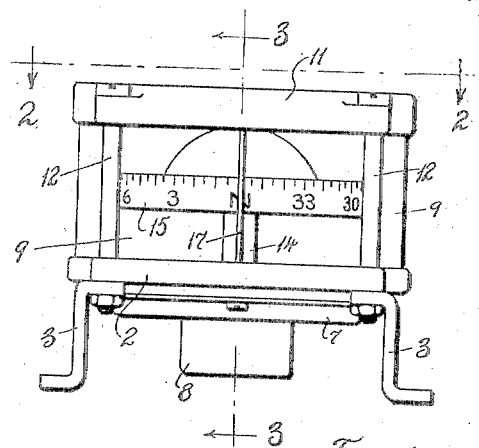
Figure 1 is a front or side view of the compass, as indicated by the line 1—1 of Fig. 2.
Figure 3:
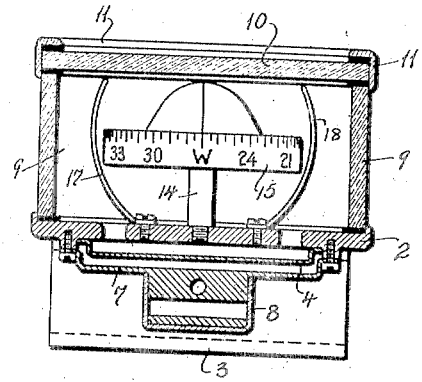
Fig. 3 is a side view of the compass, as indicated by the lines 3—3 of Figs. 1 and 2. In this view the compass is shown in section, with the liquid removed.

Lubber lines 17 and 18 are disposed in the bowl adjacent the rim of the magnetic element. These lubber lines are so arranged that a plane passed through them would also pass through the center of the card, and this plane or center line would point out the direction in which the craft, upon which the compass is mounted, is headed or flying. The direction of this heading is then indicated by the mark on the vertical card adjacent to lubber line 17 and by the mark on the horizontal card adjacent to lubber line 18, assuming that the compass is being observed as in Fig. 1, or on the north side. The lubber line 18 and the card 16 are observed through the transparent top of the compass and the lubber line 17 and the card 15 are observed through the transparent sides of the compass, by an observer who is facing approximately in the direction in which the craft is heading. If, however, the compass is observed from the other side, as may be advantageous in aircraft, the direction pointed out by the stern or tail of the craft is read through the top of the compass by means of the lubber line 17 and the card 16, or through the sides of the compass by means of lubber line 18 and card 15. Being able to read the compass from either the top or side, and from either the front or back is one of the objects of the invention herein disclosed, for it often happens that more than one person is observing the compass at the same time. For instance the compass may be so placed in an aeroplane that the pilot will observe it from the top while the navigator or observer will read it from the side, or vice versa. Hence the advantage in a compass having a two-part card with the characteristic graduations, and a transparent container as described.

In observing the vertical card 15 through the transparent cylindrical sides of the compass, the card is seen greatly magnified in its horizontal dimension. This is because the transparent cylindrical sides, together with the liquid between the sides and the card, form a cylindrical lens.

In a compass used on aircraft it is important that the float shall receive a minimum of disturbance, due to the movements of the craft, particularly the turning of the craft. The movement of the craft is transmitted to the compass bowl, which contains the liquid, but as the major portions of this bowl are made of a smooth transparent substance such as glass, movement of the bowl has a minimum of frictional effect on the liquid, and as the liquid is very little disturbed, the float is very little affected by the movements of the aircraft. The compass therefore provides an adequate and dependable navigating instrument for all manner of craft, and is strong and durable in construction.

Having described my invention what I desire to patent and secure by Letters Patent is:

1. A compass, comprising in combination, a magnetic element having two cards, the graduations of which are opposite, that is: one card graduated so that the marks on the card correspond to the direction which would be pointed out by a line drawn from the center of the card through the mark, and the other card graduated so that the marks on the card correspond to the direction which would be pointed out by a line drawn from the mark to the center of the card; the first named card being in an approximately horizontal plane and adapted to be observed and read from above, and the second named card being in an approximately vertical plane and adapted to be observed and read from the side.

2. A compass, comprising in combination, a magnetic element having two cards, the graduations of which are opposite, that is: one card graduated so that the marks on the card correspond to the direction which would be pointed out by a line drawn from the center of the card through the mark, and the other card graduated so that the marks on the card correspond to the direction which would be pointed out by a line drawn from the mark to the center of the card; the first named card being in an approximately horizontal plane and adapted to be observed and read from above, and the second named card being in an approximately vertical plane and adapted to be observed and read from the side; liquid surrounding the magnetic element and cards; and a container comprising a transparent cylinder and a transparent plate, and means for holding together said cylinder and plate.

In testimony whereof I affix my signature.

CHARLES H. COLVIN.